United States Patent [19]

Shelton

[11] 4,031,942
[45] June 28, 1977

[54] WINDOW SCREENS FOR VANS AND THE LIKE

[75] Inventor: Warren E. Shelton, Cleveland, Ohio

[73] Assignee: Van-Camper Corporation, Cleveland, Ohio

[22] Filed: Dec. 15, 1975

[21] Appl. No.: 640,708

[52] U.S. Cl. .............................. 160/103; 160/180; 160/369; 160/DIG. 18

[51] Int. Cl.² .......................................... E06B 3/32

[58] Field of Search ........... 160/103, 105, DIG. 18, 160/180, 369; 135/15 R, 15 CF, 14 D, 14 V

[56] References Cited

UNITED STATES PATENTS

| | | | |
|---|---|---|---|
| 1,602,801 | 10/1926 | Walker | 160/DIG. 18 |
| 1,704,157 | 3/1929 | Webber | 160/180 |
| 1,927,387 | 9/1933 | Bixenstein | 135/14 D |
| 2,223,477 | 12/1940 | Bernier | 160/DIG. 18 UX |
| 3,288,200 | 11/1966 | Gagne | 160/180 |

Primary Examiner—Philip C. Kannan
Attorney, Agent, or Firm—Isler and Ornstein

[57] ABSTRACT

A window screen is provided which is especially adapted for use on vans or like vehicles, and which includes means formed as an integral part thereof, for facilitating access to the latching device usually provided on such vans for opening and closing the windows of the van whereby the window may be opened or closed without removal of the screen. The screen has a frame of special cross-section designed to facilitate attachment of screening thereto, as well as attachment of the screen to the window frame or opening.

3 Claims, 4 Drawing Figures

U.S. Patent    June 28, 1977    Sheet 2 of 4    4,031,942
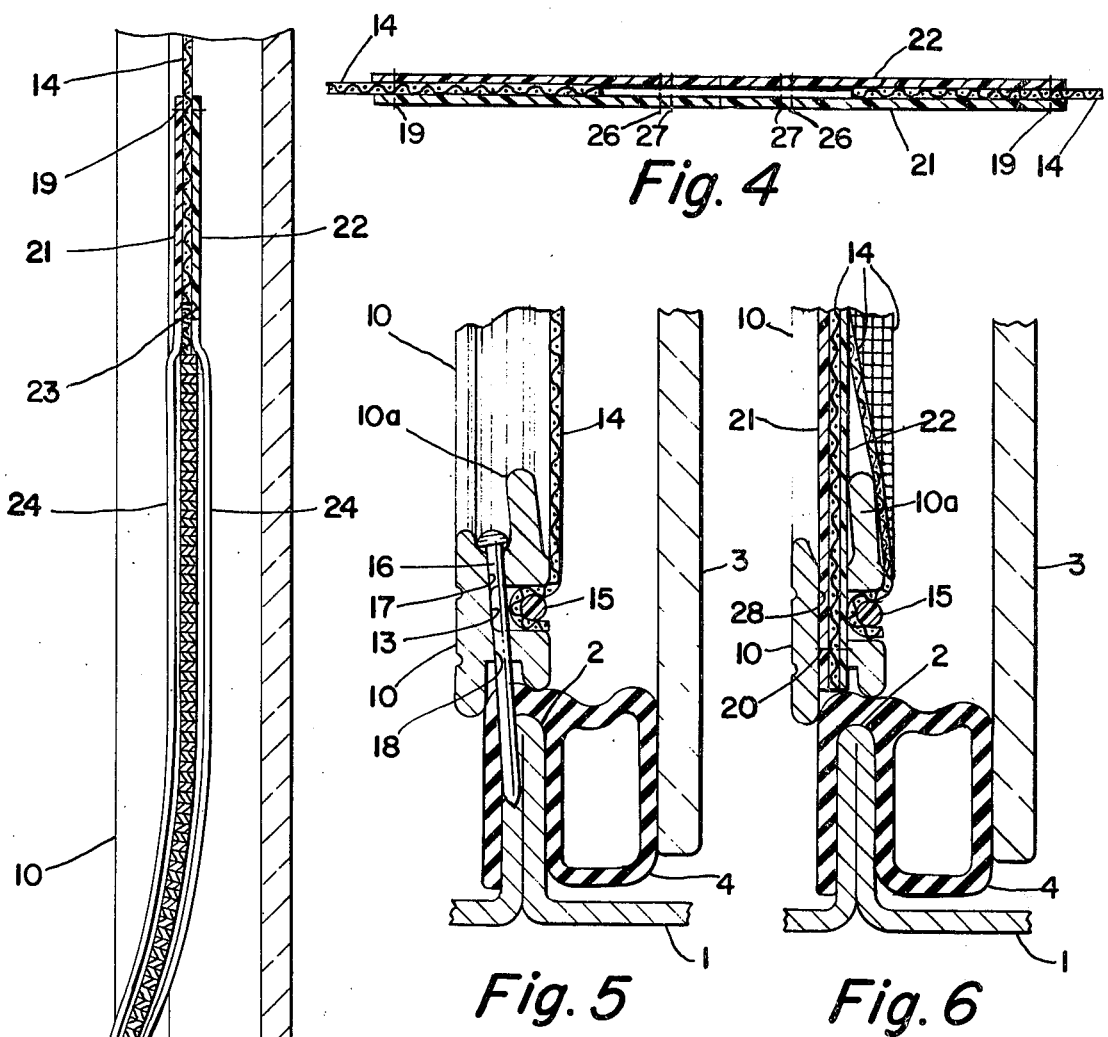
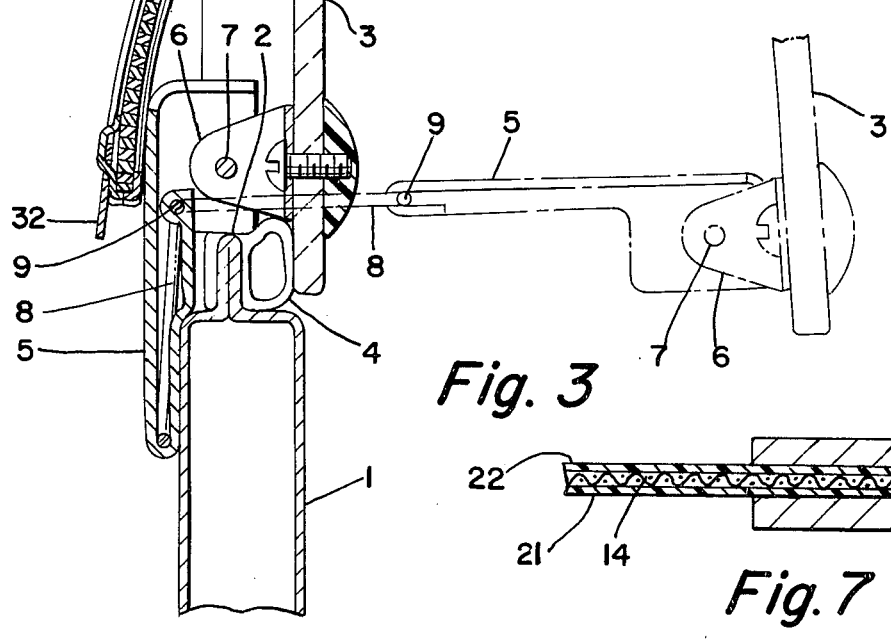

WINDOW SCREENS FOR VANS AND THE LIKE

This invention relates, as indicated, to window screens, but has reference more particularly to a screen which has been especially designed for use in vans or like vehicles.

A primary object of the invention is to provide a screen of the character described, which is of sturdy construction and especially adapted for attachment to the van from the interior of the van.

Another object of the invention is to provide a screen of the character described, having a frame of especially designed cross-section, and to which screening may be quickly and easily secured, for original and replacement purposes.

A further object of the invention is to provide a screen of the character described, which has means provided as an integral part thereof providing access to a window latching device for opening and closing the window with which the screen is associated, whereby the window may be opened or closed, without removal of the screen from the window opening.

A still further object of the invention is to provide a screen of the character described, having means in the lower center portion of screen through which the hand may be inserted for the purpose of opening and closing the window, and which means is provided with a zipper for opening and closing said means.

Other objects and advantages of my invention will be apparent during the course of the following description.

In the accompanying drawings forming a part of this specification, and in which like numerals are employed to designate like parts throughout the same, FIG. 1 is a fragmentary elevational view of the window screen, as viewed from the interior of a van;

FIG. 3 is a fragmentary cross-sectional view, at full-size scale, taken on the line 3—3 FIG. 2;

FIG. 4 is a fragmentary cross-sectional view, taken on the line 4—4 of FIG. 2;

FIG. 5 is a fragmentary cross-sectional view, taken on the line 5—5 of FIG. 2;

FIG. 6 is a fragmentary cross-sectional view, taken on the line 6—6 of FIG. 2;

FIG. 7 is a fragmentary cross-sectional view, taken on the line 7—7 of FIG. 2;

Figure 1:
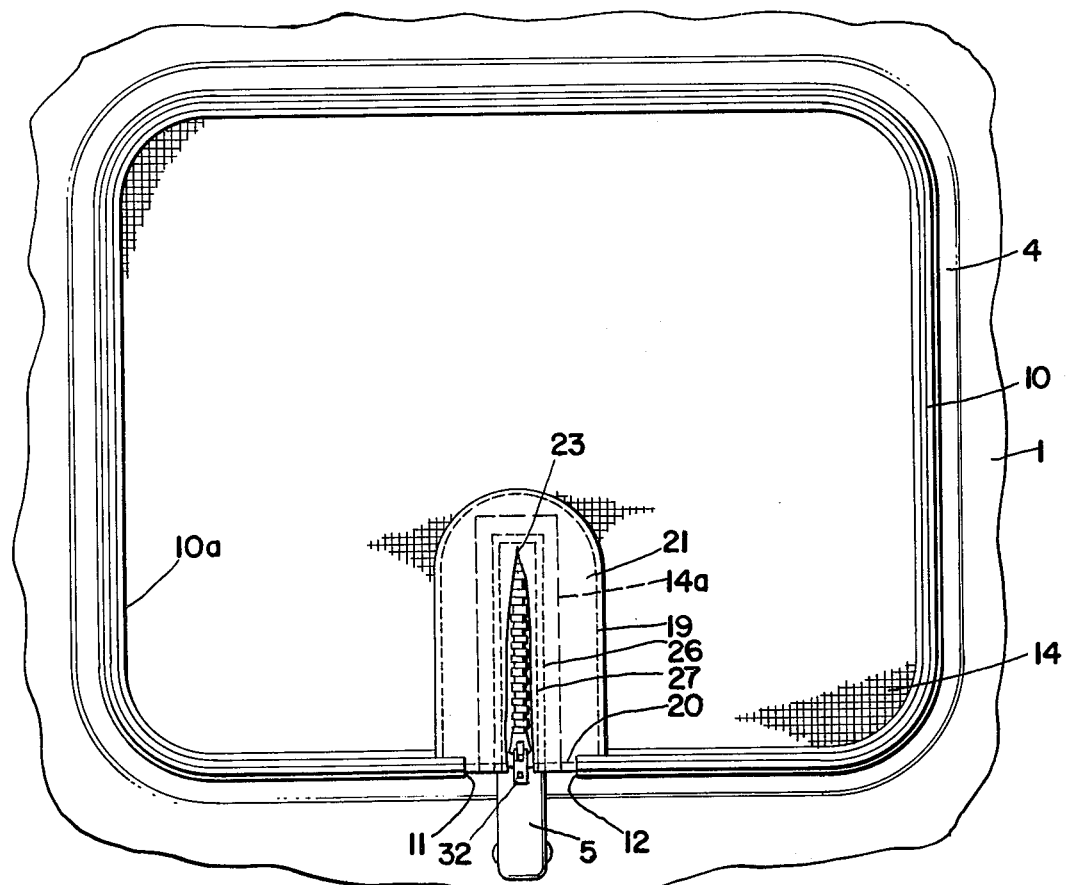

Referring more particularly to FIGS. 1 to 7 inclusive of the drawings, reference numeral 1 designates the body of a van or like vehicle, such as is commonly used as a car, truck or camper.

The body 1 is provided with a portion 2 which provides an opening which is normally closed by a window 3.

The opening 2 is bordered by a gasket or moulding 4, of rubber or like material, which provides not only a seal for the window 3, but a seal or seat for a window screen, to be presently described.

The window 3 is pivotally secured at its upper end to the body 1 of the van, at or adjacent the upper edge of the opening 2, and is shown in closed position in solid lines in FIGS. 3, 5 and 6, and in open position, by the broken lines in FIG. 3.

For the purpose of opening and closing the window 3, a latching device is provided, which is usually a part of the van construction, and may assume various forms.

Figure 2:
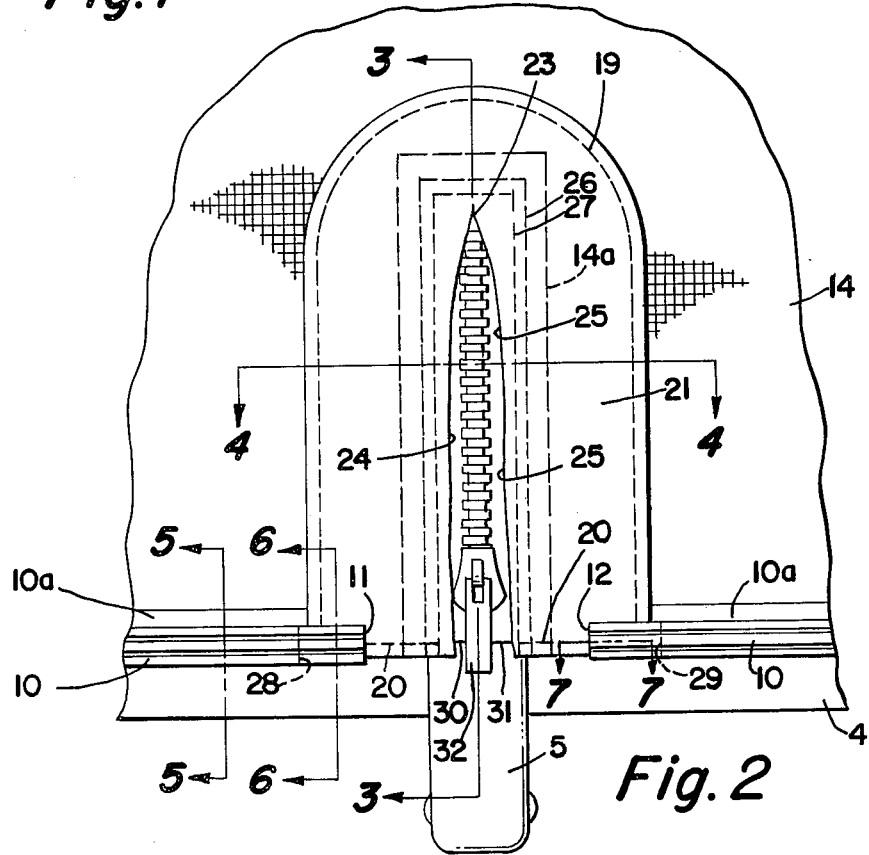
FIG. 2 is a portion of the screen of FIG. 1, on an enlarged scale.

The latching device shown in FIGS. 1, 2 and 3, comprises an actuating handle 5, which is pivotally connected to a bracket 6 on the window 3, as at 7, and a lever or link 8, which is pivotally connected to the handle 5, as at 9.

The present invention is concerned more particularly with the screen, which will now be described.

The screen comprises a frame 10 of extruded aluminum or the like, and of generally rectangular contour.

The frame 10 extends from a point 11, spaced from one edge of the actuating handle 5 to a point 12, spaced from the opposite edge of the actuating handle 5.

The frame 10 is of the cross-sectional contour shown in FIG. 5, and is provided in its rear portion with a recess 13, in which is received the peripheral portion of the screen 14, which is preferably made of aluminum screen wire. The peripheral portion of the screen, as best seen in FIG. 5 and 6, is wedgingly secured in the recess 13, by means of a strip 15 of a plastic or like material.

The screen frame 10 is maintained in sealed relation to the gasket or moulding 4 in the manner shown in FIG. 5, and is permanently secured in such position by means of nails 16, which are driven through the gasket 4 and into the body 1 in the manner shown in FIG. 5. For this purpose, holes 17 and 18, of a size to accommodate the nails 16, may be drilled through the frame 10, at a number of selected points about the frame, and the nails driven through these holes.

In order to insure that the nails 16 are properly driven into the body 1, it is desirable to drill the holes 17 and 18 in the frame 10 at an angle to the front face of the frame, as shown in FIG. 5, and, as a further means for facilitating this angulating of the nails, the frame 10 is provided with a flange 10a, which is at substantially the same angle to the front face of the frame 10 as the holes 17 and 18, and which acts as a guide for directing the nails toward these holes.

For the purpose of obtaining access to the actuating handle 5 for actuating this handle to open or close the window 3, a rectangular portion of the screening 14 is removed, the edge of which portion is denoted by the broken line 14a in FIGS. 1 and 2.

Secured to the screening 14, as by lines of stitching 19 and 20, are piece 21 and 22 of vinyl-coated fabric or the like, each of which has a slit therein extending from the lower edges of these pieces to a point 23, and the edges of which are indicated by reference numerals 24 and 25 (see FIGS. 2 and 3).

The pieces 21 and 22 are also secured to each other by the lines of stitching 19 and 20, as well as by lines of stitching 26 and 27.

Portions of the frame 10 are vertically slotted, as at 28 and 29 (see FIGS. 2, 6 and 7), to receive or accommodate the lower portions of the pieces 21 and 22 and the screening 14 therebetween, as shown in FIGS. 2 and 7. The portions of the frame which define the slots are clamped to the lower portions of the pieces 21 and 22 and the screening therebetween to securely hold them in place.

Secured to and between the pieces 21 and 22, as by the lines of stitching 26 and 27, are complementary strips 30 and 31 (see FIG. 2) of a zipper, the actuator of which is indicated by reference numeral 32.

The zipper 30 and 31 is normally closed, but when it is desired to gain access to the latching device, for the purpose of opening the window, the zipper is opened, the window 3 moved to the position shown in broken lines in FIG. 3, and the zipper is then closed to bar entrance of insects into the van through the slits in the pieces 21 and 22 and the opening which would otherwise be provided by the zipper in opened position.

When it is desired to close the window, the zipper is opened, and the window closed by manipulation of the latching device, after which the zipper is again closed.

In the modification of the invention shown in FIG. 8 to 14 inclusive, the body 40 of the van or like vehicle is provided with a portion 41 which provides an opening which is normally closed by a window 42.

The opening 41 is bordered by a gasket or moulding 43, of rubber or like material, which provides not only a seal for the window 42, but a seal or seat for a window screen to be presently described.

Figures 10, 11, 12, 13, 14:
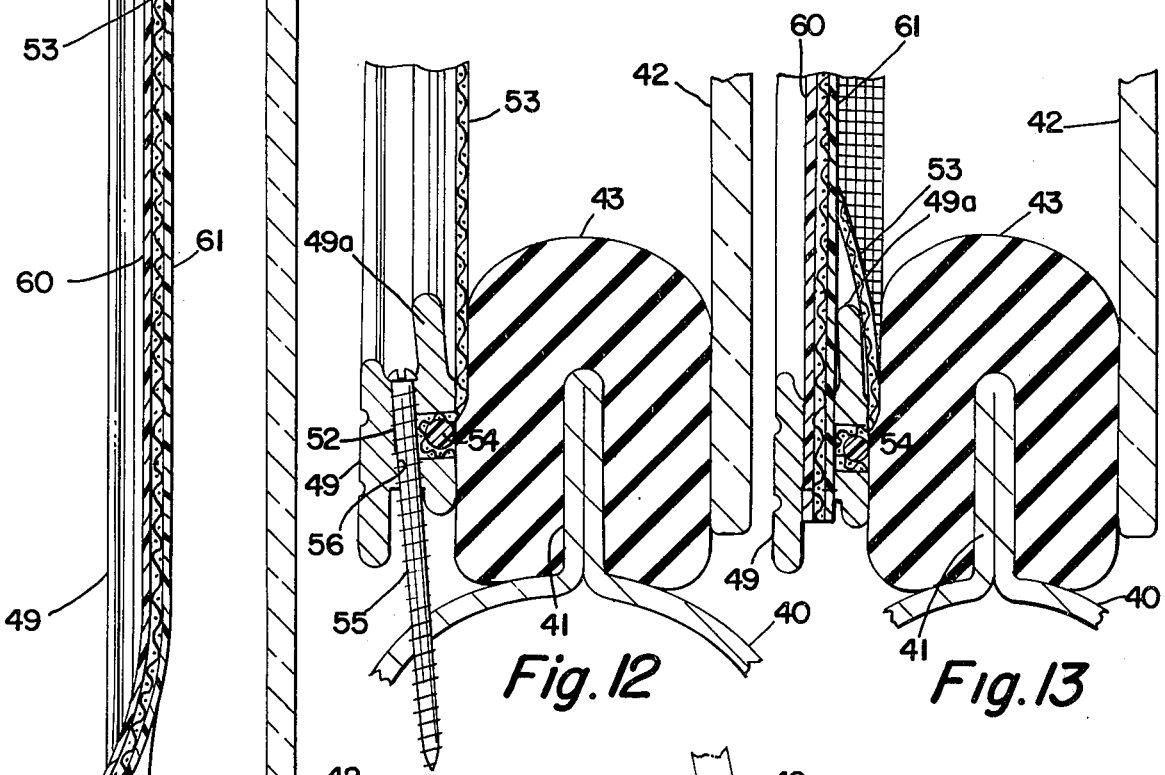
FIG. 10 is a fragmentary cross-sectional view, at fullsize scale, taken on the line 10—10 of FIG. 9.
FIG. 11 is a fragmentary cross-sectional view, taken on the line 11—11 of FIG. 9.
FIG. 12 is a fragmentary cross-sectional view, taken on the line 12—12 of FIG. 9.
FIG. 13 is a fragmentary cross-sectional view, taken on the line 13—13 of FIG. 9.
FIG. 14 is a fragmentary cross-sectional view, taken on the line 14—14 of FIG. 9.

The window 42 is pivotally secured at its upper end to the body 40 of the van, at or adjacent the upper edge of the opening 41, and is shown in closed position in solid lines in FIGS. 10, 12, and 13, and in open position, by the broken lines in FIG. 10.

For the purpose of opening and closing the window 42, a latching device is provided, which is usually a part of the van construction, and may assume various forms.

Figure 8:
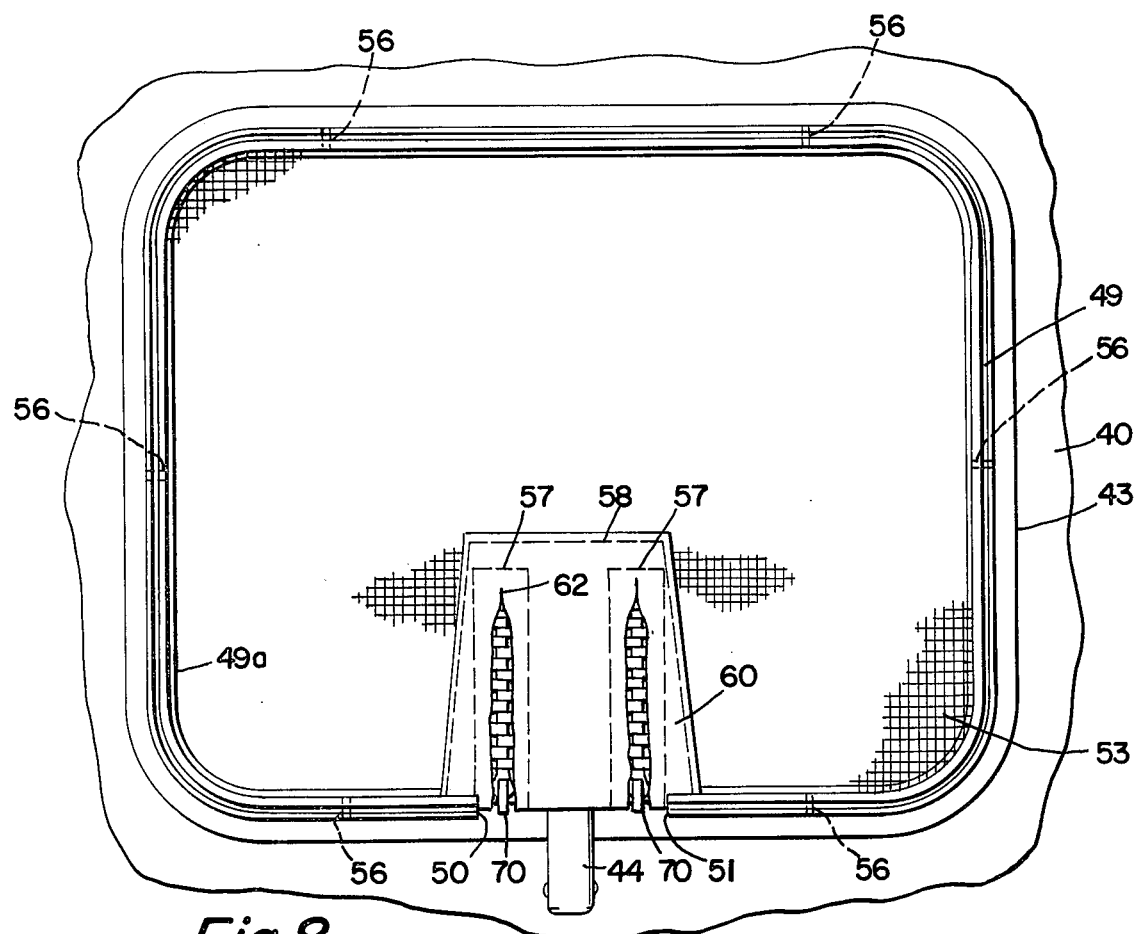
FIG. 8 is a view similar to FIG. 1, but showing a modification of the invention.
Figure 9:
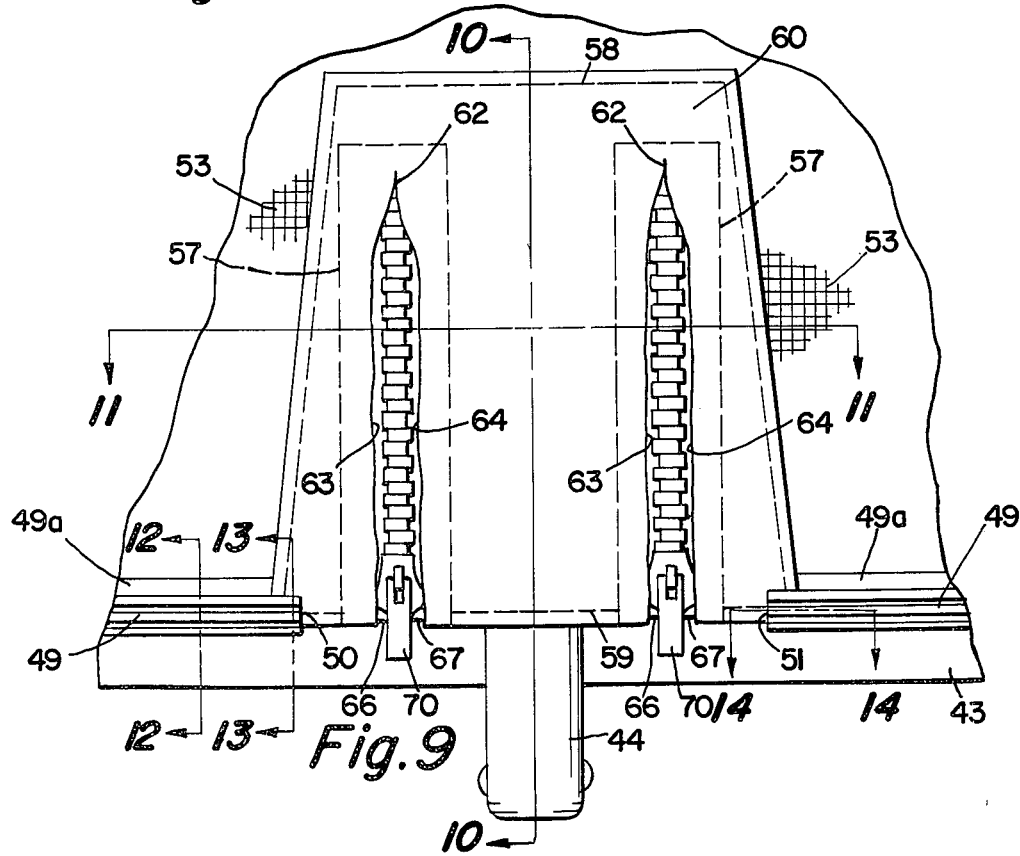
FIG. 9 is a view similar to FIG. 2, but of the modification.

The latching device shown in FIGS. 8, 9 and 10 comprises an actuating handle 44, which is pivotally connected to a bracket 45 on the window 42, as at 46, and a lever or link 47, which is pivotally connected to the handle 44, as at 48.

The screen, in this modification, is similar to the previously described screen, but with some differences which will presently be described.

The screen comprises a frame 49 of extruded aluminum or the like, and of generally rectangular contour.

The frame 49, as best seen in FIGS. 8 and 9, extends from a point 50, spaced from one edge of the actuating handle 44, to a point 51, spaced from the opposite edge of the actuating handle 44.

The frame 49 is of cross-sectional contour shown in FIG. 12, and is provided at its rear portion with a recess 52, in which is received the peripheral portion of the screen 53, which is preferably made of aluminum screen wire. The peripheral portion of the screen, as best seen in FIGS. 12 and 13, is wedgingly secured in the recess 52, by means of a strip 54 of a plastic or like material.

The screen frame 49 is maintained in sealed relation to the gasket or moulding 43 in the manner shown in FIG. 12, and is permanently secured in such position by means of trim head dry wall screws 55, which are driven through the frame 49 and into the body 40 in the manner shown in FIG. 12. For this purpose, holes 56, of a size to accomodate the screws 55, are pre-drilled through the frame 49, at a number of selected points, as best seen in FIG. 8, and the screws driven through these holes.

In order to insure that the screws 55 are properly driven into the body 40, it is desirable to drill the holes 56 in the frame 49 at an angle to the front face of the frame, as shown in FIG. 12, and, as a further means for facilitating this angulating of the screws, the frame 49 is provided with a flange 49a, which is at substantially the same angle to the front face of the frame 49 as the holes 56, and which acts as a guide for directing the screws toward these holes.

For the purpose of obtaining access to the actuating handle 44 for actuating this handle to open or close the window 42, rectangular portions of the screening 53 are removed, the edges of which portions are denoted by the broken lines 57 in FIGS. 8 and 9.

Secured to the screening 53, as by lines of stitching 58 and 59, are pieces 60 and 61 of vinyl-coated fabric or the like, of isosceles trapezoidal contour or configuration, each of which has a pair of spaced slits therein extending vertically-upward from the lower edges of these pieces to points 62 (FIGS. 8 and 9), and the edges of which are indicated by reference numerals 63 and 64 (FIG. 9).

Portions of the frame 49 are vertically slotted, as at 65 (FIG. 14), to receive or accommodate the lower portions of the pieces 60 and 61 and the screening 53 therebetween, as shown in FIGS. 9 and 14. The portions of the frame which define the slots 65 are clamped to the lower portions of the pieces 60 and 61 and the screening therebetween to securely hold them in place.

Secured to and between the pieces 60 and 61, are complementary strips 66 and 67 (see FIG. 9) of zippers, the actuators of which are indicated by reference numerals 70.

The zippers 66 and 67 are normally closed, but when it is desired to gain access to the latching device, for the purpose of opening the window, the zippers are opened, so that the portions of the pieces 60 and 61 between these zippers conjointly form a flap or door which can be lifted away from the plane of the remaining portions of the pieces 60 and 61, thereby providing ample space for the hand to reach the latching device and move the window 42 to the position shown in broken lines in FIG. 10. The zippers are then closed, thereby restoring the aforesaid flap or door to its initial position, and barring entrance of insects, dust, etc. into the van through such flap or door and through the slits in the pieces 60 and 61 at which the zippers are located.

When it is desired to close the window, the zippers are opened, the flap or door again lifted, and the window closed by manipulation of the latching device, after which the zippers are again closed to restore the flap or door to its initial position.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. A screen for use in combination with an openable window mounted within a window opening in a van or like vehicle and having a window manipulating handle affixed to the window adjacent one edge thereof and projecting inwardly of the opening, said screen comprising a rigid frame conforming to the periphery of the window opening for reception thereabout inward of the window, said frame having a pair of spaced ends aligned with each other for positioning to the opposite sides of the window handle upon a positioning of the screen about the window opening, said screen further including flexible wire screening having a peripheral edge secured to said frame peripherally about the frame and covering the area bounded by the frame, slot means through the edge of the screening between the spaced ends of the frame and alignable with the window handle for access thereto, said slot means extending inwardly from the edge of the screening for only a portion of the width of the screening, at least one piece of flexible material secured to said screening in overlying relationship to said slot means, said flexible material having an outer edge extending between the spaced ends of the frame, said piece of material having spaced slits therein paralleling and overlying said slot means and extending inwardly from the outer edge of the material, and a pair of zipper assemblies mounted on said piece of material with one zipper assembly associated with each slit for a selective opening and closing thereof, the portion of the flexible material between the zipper assemblies, upon an opening of both zipper assemblies, defining an access for the window handle, said flexible material and zipper assemblies, when closed, being inwardly flexible to accommodate the inwardly projecting window handle.

2. A screen as defined in claim 1 wherein said frame includes a rear portion, a front face generally paralleling said rear portion, and inner and outer edges, fastener accommodating holes formed through said frame between the inner and outer edges thereof, each hole angling rearwardly, relative to the front face, from the inner edge to the outer edge, and an inwardly projecting flange projecting from the inner edge of the frame immediately rearward of the holes and at an angle substantially parallel to the angle of the holes, said flange defining a guide for fasteners driven through said holes.

3. For use in combination with a van or like vehicle having a body, a window opening in said body, a moulding bordering said window opening and a window engageable against said moulding for closing said window opening; a screen for said window opening, said screen comprising a frame and screening attached to said frame, said frame including a rear portion for abutment against the moulding, a front face generally paralleling said rear portion, and inner and outer edges, fastener accommodating holes formed through said frame between the inner and outer edges thereof, each hole angling rearwardly, relative to the front face, from the inner edge to the outer edge, and an inwardly projecting flange projecting from the inner edge of the frame immediately rearward of the holes and at an angle substantially parallel to the angle of the holes, said flange defining a guide for fasteners driven through said holes.

* * * * *